United States Patent Office 3,459,616
Patented Aug. 5, 1969

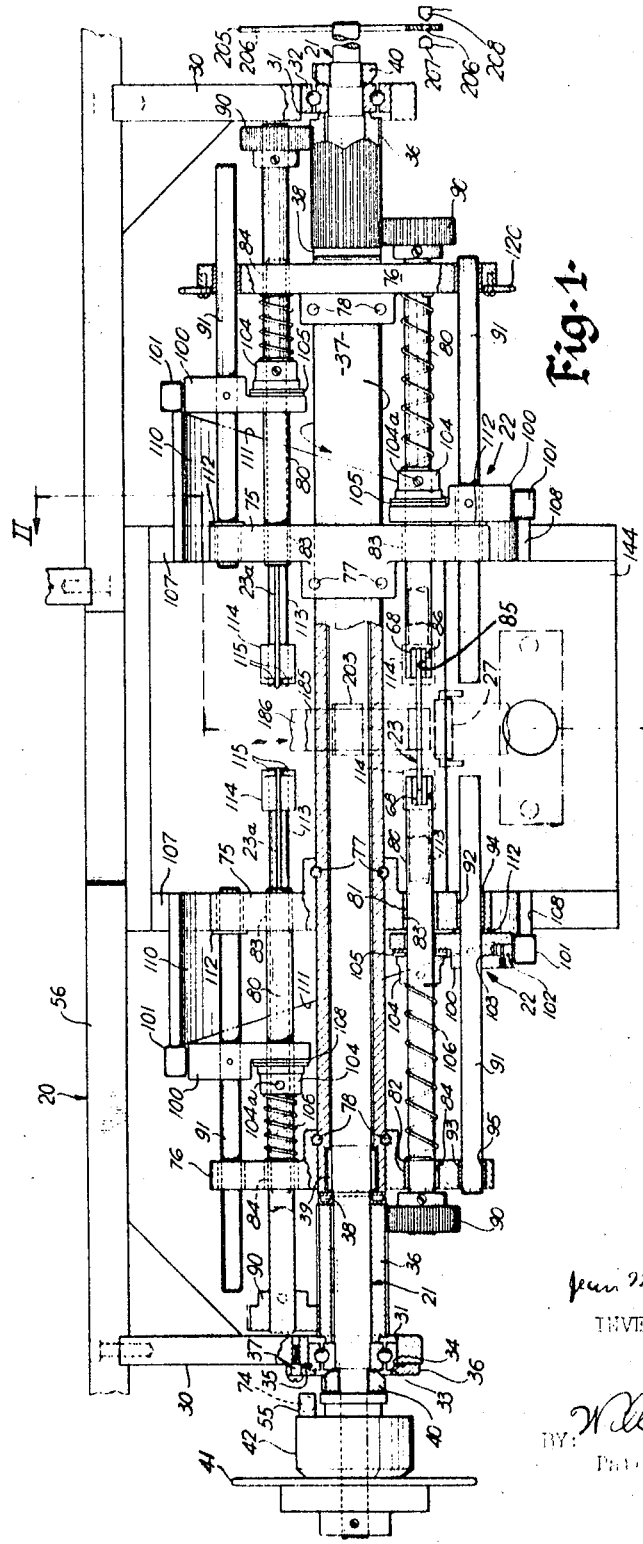

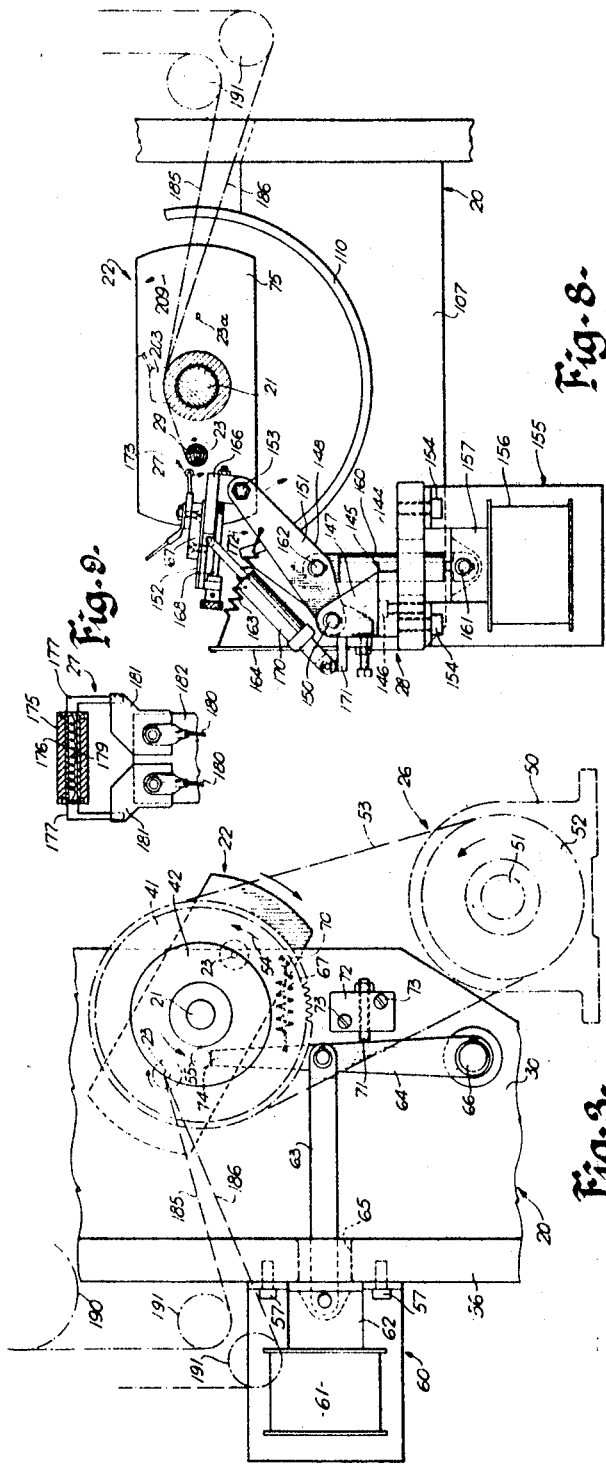

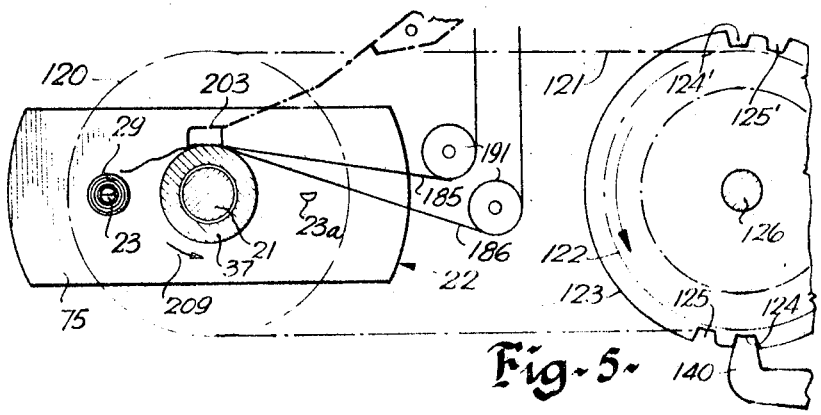
Fig-5-
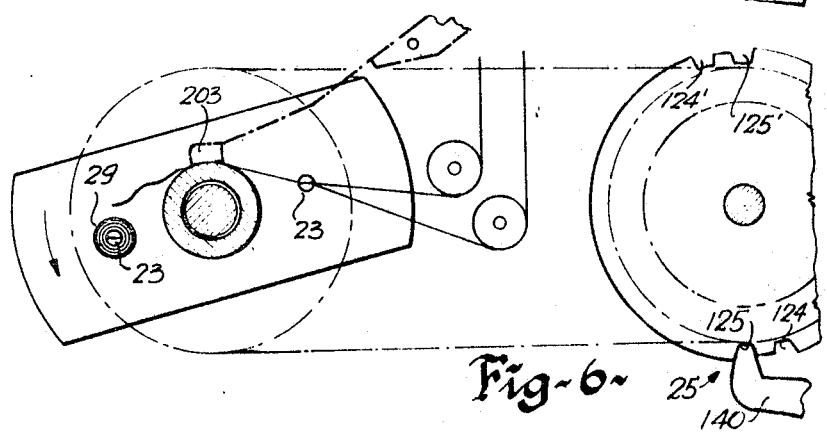
Fig-6-
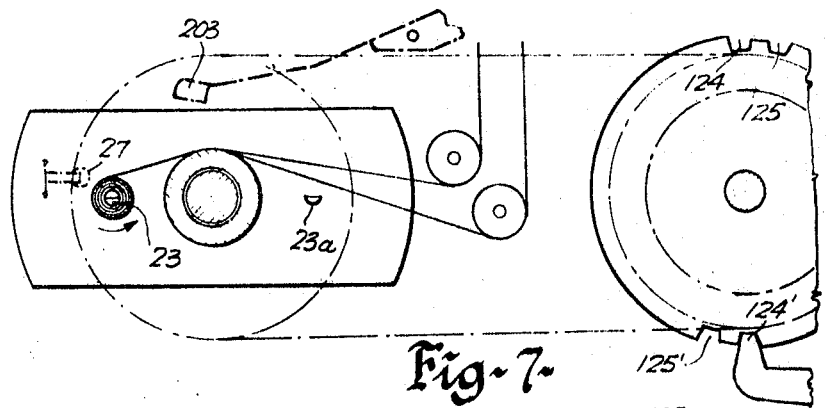
Fig-7-
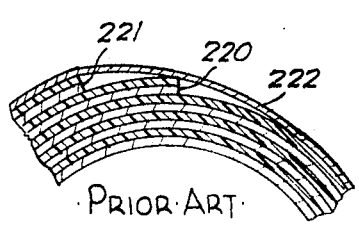
PRIOR ART
Fig-11-
Fig-12-

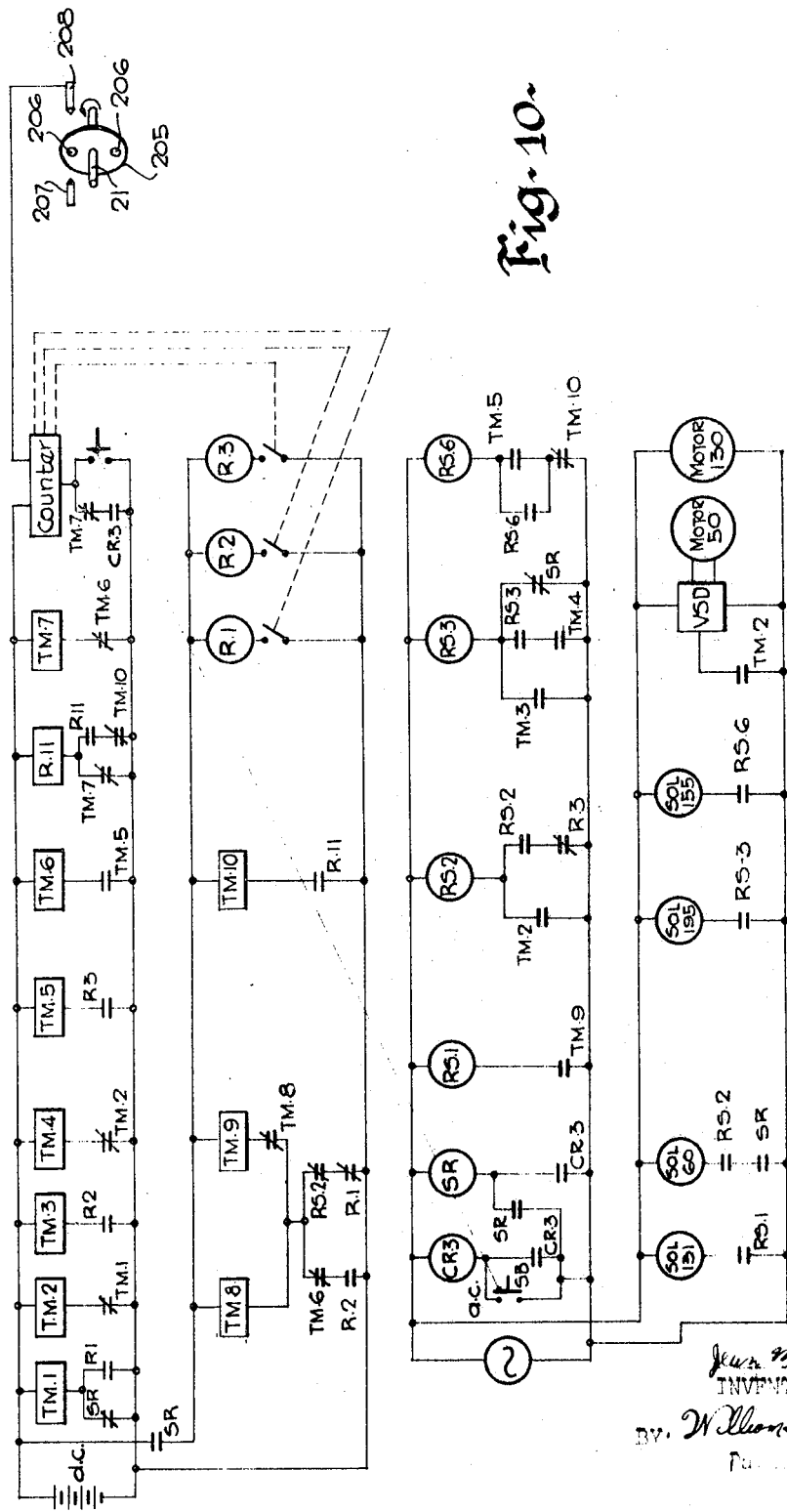

3,459,616
METHOD AND APPARATUS FOR MAKING WOUND FILM CAPACITORS FROM CONTINUOUS STRIPS
Jean M. Dupuis, St. Bruno, Quebec, Canada, assignor to Northern Electric Company Limited, Montreal, Quebec, Canada
Filed May 6, 1965, Ser. No. 453,615
Int. Cl. B65h 81/00, 39/16
U.S. Cl. 156—184                 11 Claims

ABSTRACT OF THE DISCLOSURE

An apparatus and method of producing a capacitor-forming roll from a pair of continuous strips of the type consisting of a dielectric plastic web having a metallic band formed integrally along one surface of the web. The pair of strips is wound on a spinning mandrel to form a roll, and an elongated heating element which extends parallel to the roll is provided on a mounting mechanism adapted to move the heating element into contact with the roll and to draw it a short arcuate distance along the periphery of the roll so that the metallic band is vaporized along the arcuate distance and the webs are severed from the continuous strips and fused onto the roll to thereby seal the capacitor-forming roll.

---

This invention relates to a method and apparatus for making capacitors of the wound film type from continuous strips of material.

One known process for making wound film capacitors involves winding two separate continuous metallized strips of dielectric material on a mandrel to form a roll, severing the roll from the continuous strips and then winding an adhesive strip about the roll to prevent the roll from unravelling. Each of the strips consists of a continuous dielectric plastic web having an electrode band of vaporized metal along one side surface, and when the strips are wound on the mandrel the roll is formed of interleaved dielectric and electrode layers. In order to isolate the two outer electrode layers, i.e. the electrode bands at the end of the winding, it is necessary to cut the two strips at different lengths. In known machines the cutting step is time consuming and involves stopping the machine. Moreover, subsequent to the cutting step but before the adhesive can be applied, the wound strips are free to move both tangentially and axially. Because of this freedom of movement of the strips, the capacitance of mass produced capacitors from the above process vary considerably.

It is an object of the present invention to provide a method and apparatus for making capacitors which eliminate the steps of cutting the strips at different lengths and then subsequently applying an adhesive strip to the roll.

It is a further object to provide a method and apparatus for winding capacitors which make it possible to substantially simultaneously sever the roll from the continuous strips and to seal the outer layers of the roll to the outer periphery of the roll the instant the winding step is stopped.

According to the method of the present invention, the continuous strips are wound together to form a roll of interleaved dielectric and electrode layers, and then an element heated to a temperature sufficient to vaporize the outer electrode layers and to melt the outer dielectric layers is pressed briefly against the outer peripheral surface of the roll, the element extending across the length of the roll, whereby the strips are severed across their width from the roll and the melted outer dielectric layers run together and fuse to seal the ends to the outer periphery of the roll.

Because the element is heated above the vaporization temperature of the electrode layers and extends across the length of the roll, the outer electrode layers are vaporized in the area of the severed ends and the fused seal, and accordingly any electrical connection between the electrode layers is avoided. Moreover, in view of the fact the severing and fusing of the layers occurs substantially simultaneously there is no opportunity for relative movement of the strips forming the roll, and as a result, the resulting capacitors have a uniform capacitance. Since the operation of pressing the heated element is of a simple nature and can be carried out very quickly after the winding is stopped, the process of making a capacitor is accelerated.

Preferably, the heated element is drawn relative to the periphery of the roll when in engagement therewith a short arcuate distance therealong. This step provides for a larger and yet more superficial area of electrode vaporization and a better seal between the outer dielectric layers.

According to the apparatus of the present invention, there is provided a roll winding mandrel having means for holding the strips prior to winding, and motor means arranged to rotate the mandrel and thereby wind the strips about the mandrel. Also provided are a band vaporizing and web melting heating element and means arranged to impart relative movement between the mandrel and heating element for bringing the element into engagement with an area on the periphery of the roll extending across the length of the roll.

In a specific embodiment of the invention the heating element comprises an elongated member at least equal in length to the capacitor-forming roll, and the movement imparting means includes a carrier linkage which holds the heating element parallel to the mandrel and a motor means connected to the linkage for shifting the linkage through a sever and fuse stroke. The linkage and motor means are arranged to draw the heating element a short arcuate distance along the periphery of the roll on the mandrel.

Reference is now made to the accompanying drawings, which show an embodiment of the apparatus according to the present invention, by way of example, and in which:

FIGURE 1 is a partial plan view of a machine according to the present invention for making capacitor-forming rolls, certain parts being omitted for sake of clarity;

FIGURE 3 is a side view of a drive system for rotating the mandrels;

FIGURES 5 to 7 are diagrammatic views illustrating the relationship between the drive system of FIGURE 4 and the positions of the winding mandrels at three different stages during an operating cycle of the machine;

FIGURE 8 is a side view of the heating element and the mechanism for controlling its sever and fuse stroke;

FIGURE 9 is an enlarged cross-sectional view through one embodiment of the heating element;

FIGURE 10 is a schematic diagram of the electrical cotrol circuits of the machine of the present invention;

FIGURE 11 is an enlarged cross-sectional view showing the outer layers of a capacitor-forming roll prepared by previously used methods; and FIGURE 12 is an enlarged cross-sectional view showing the outer layers of a capacitor-forming roll and the tail of the continuous strips as fused and severed in accordance with the present invention.

Figure 2:
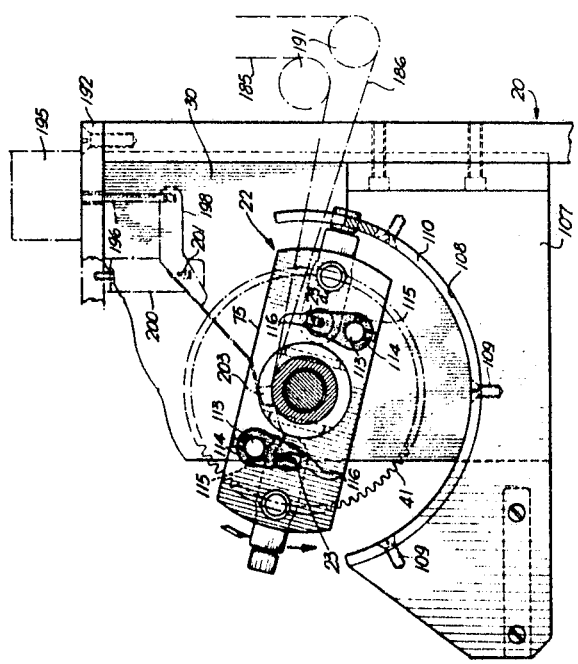
FIGURE 2 is a cross-sectional view through the machine of FIGURE 1 taken along the line II—II.

In the drawings, the reference numeral 20 denotes generally a frame (FIGS. 1, 2, 3, 4 and 8), in which is mounted a rotatable shaft 21 (FIGS. 1 to 3 and 5 to 8). Mandrel carriages 22, 22 are mounted for rotation on shaft 21 and carry a pair of split mandrels 23, 23 as shown in FIGURE 2, for example. A drive system 25 is drivingly connected to carriages 22, 22 for indexing the mandrels 23, 23, (FIG. 4), and a drive system 26 is drivingly connected to the mandrels 23, 23 for rotating them (FIG. 3). A heating element 27 carried by its operating mechanism 28 is mounted on frame 20 in the vicinity of the mandrels 23, 23 (FIG. 8).

The frame 20 includes vertical side plates 30, 30 which are parallel to each other and have aligned openings 31, 31 (FIG. 1). Bearing members 32, 33 are located in openings 31, 31 and mount shaft 21 for rotation in the frame 20. Bearing member 33 has a circumferential groove 34 in its outer periphery adjacent the outer edge thereof, and a snap ring 35 or similar means is received in the groove and extends radially outward from the outer periphery of the bearing member 33. An annular plate 36 surrounds the opening 31 and is secured to the side plate 30 by a screw 37, the snap ring 35 being clamped between side plate 30 and annular plate 35 to thereby fix bearing member 33 against axial movement.

Mounted on shaft 21 immediately inside of bearing members 32 and 33 are elongated external gears 36, 36, which are keyed to shaft 21 for rotation therewith. An elongated sleeve 37 extends between gears 36, 36 and surrounds the central portion of shaft 21, the sleeve 37 being journalled on shaft 21 by bearing members 39, 39. Thrust bearing members 38, 38 are located between opposite ends of sleeve 37 and gears 36, 36, the axial relationship between the gears 36, 36 and sleeve 37 and the shaft 21 being fixed by end nuts 40, 40, threaded onto shaft 21 and bearing against outside of bearings 32, 33 so as to clamp the gears 36, 36, sleeve 37 and all of the bearing members therebetween. The shaft 21 and all of the elements held on shaft 21 between nuts 40, 40 are fixed against axial movement relative to the frame 20 because bearing 33 is fixed against axial movement by snap ring 35 as previously described.

The shaft 21 has a sprocket 41 (FIGS. 1 and 3) mounted adjacent one of its ends, the sprocket 41 being arranged to drive the shaft 21 through a slip clutch 42 of any well known type. The clutch 42 normally permits the sprocket to rotate shaft 21, but when clutch 42 is loaded in a manner which is described below, the sprocket 41 free-wheels on shaft 21. An electric motor 50 (FIG. 3) is provided adjacent sprocket 41, the motor 50 being controlled to run continuously at either of two different speeds all of the time the machine of the present invention is in operation. The operation and control of the motor is described in more detail below. The motor 50 has an output shaft 51 on which is mounted a sprocket 52. A chain drive 53 connects sprockets 41 and 52 so that all during the operation of the machine the sprocket 41 is rotated in the direction of dotted arrow 54 in FIGURE 3.

The slip clutch 42 includes one portion fixed to the sprocket 41 and another portion fixed to the shaft 21 with means therebetween for permitting relative slip. A short projection 55 is secured to the portion of the clutch 42 which is fixed to the shaft 21 and extends therefrom parallel to the shaft 21 (FIGS. 1 and 3). Secured by screws 57, 57 to a longitudinal extending vertical plate 56, which forms part of frame 20, is a solenoid 60. The solenoid 60, which may be of any well known type, includes a coil section 61 and an actuating core member 62. The control of the solenoid is described below, but it may be noted from FIGURE 3 that upon energization of the solenoid, actuator core 62 is drawn to the left. A rod 63 is pivotally connected at one end to actuator core 62 and pivotally connected at its other end to an arm 64, the rod 63 extending through an opening 65 in plate 56. The arm 64 is pivotally mounted on a stub shaft 66. The arm 64 has a spring 67 connected to it intermediate its ends, which spring is anchored to the side plate 30 by a screw 70 and biases the arm to the right (as seen in FIG. 3) and into engagement with a stop member 71. The stop member 71 consists of a threaded stud adjustable received in a block 72, which is fixed to side plate 30 by screws 73, 73. When the arm 64 is held against stop member 71, the outer end 74 of the arm 64 is in the path of rotation of projection 55 so that projection 55 engages end 74 and this engagement stops shaft 21 while sprocket 41, driven by motor 50, free-wheels on shaft 21. When solenoid 60 is energized, rod 63 is pulled to the left, as seen in FIGURE 3, and arm 64 is pivoted counterclockwise against the biasing effect of spring 67 and away from stop member 71. Thus, the end 74 of arm is pulled out of engagement with projection 55 so that motor 50 rotates shaft 21 through sprocket 52, chain drive 53, sprocket 41 and clutch 42. Gears 36, 36 being keyed to shaft 21 rotate with shaft 21 as it is driven by motor 50.

The two opposed mandrel carriages 22, 22, which are fixed to the sleeve 37 against rotation and axial movement construction, each carrying a pair of mandrel halves 23a. Each one of the mandrel halves 23a is an elongated member of semi-circular cross section and is directly opposite another one of the halves carried by the other carriage. The opposed halves are rotated 180° with respect to each other so that when they are moved to an overlapping position, as shown in the central lower portion of FIGURE 1, the two halves form a diametrically split mandrel 23 of circular cross-section, as shown in FIGURES 2 and 5 to 8. When the two opposed mandrel halves are retracted, as shown in the central top portion of FIGURE 1, the two halves are completely separated and spaced from each other. Each mandrel half 23a is secured in a cylindrical holder 68 (FIG. 1) as by welding.

Each carriage 22 includes two plate members 75 and 76 which are axially spaced along sleeve 37. The two plates 75, 75 of the two carriages define a winding area therebetween. The plates 75 and 76 of each carriage are fixed to the sleeve 37 against rotation and axial movement relative to the sleeve by pins 77, 77 and 78, 78 respectively, which extend through aligned bores in a hub portion of the plates and in the sleeve.

Each carriage has two mandrel supporting shafts 80, 80, each shaft 80 being received for rotation in journal bearings 81, 82 of aligned openings 83, 84 in plates 75 and 76, respectively. The shafts 80, 80 in each carriage 22 are spaced 180° apart, i.e. on opposite sides of shaft 21. The shafts 80, 80 as well as being mounted for rotation in journal bearings 81, 82 can also move axial in the bearings, and accordingly can move axially relative to the carriage 22 and sleeve 37. The end of each shaft 80 in the winding area is provided with an axially extending bore 85 which receives the cylindrical holder 68 of one of the mandrel halves 23a, the holder 68 being held in the bore 85 by a set screw 86. The opposite end of each shaft 80 has a gear 90 fixed thereon which meshes with one of the gears 36, 36. Accordingly, two gears 90, 90 mesh with each gear 36, and since gears 36, 36 are elongated, each gear 90 remains in engagement with one of the gears 36, 36 even when the shaft 80, on which the gear 90 is fixed, is axially shifted.

Spaced readily outward from each of the shafts 80 is a cam guide shaft 91, which is received for axial sliding movement in bearings 92, 93 of aligned bores 94, 95 in plates 75, 76, respectively. Each shaft 90 has fixed thereto a radially extending arm 100 which has at its outer end a cam following roller 101. The roller 101 has a stub shaft 102 mounted in a bore 103 in the arm 100 whereby the roller is rotatable about an axis which extends radially outward from the longitudinal axis of sleeve 37. Each arm 100 has a bore adjacent its inner end through which passes the adjacent shaft 80. A collar 104 is provided on each shaft 80 and is fixed to the shaft by a set screw 104a. A coil spring 106 surrounds shaft 80 and is compressed between plate 76 and collar 104 to thereby bias shaft 80 to an extended mandrel forming position, i.e. to a position in which the opposed mandrel halves 23a, 23a carried by the two carriages overlap to form a mandrel of circular cross-section as shown in the central lower portion of FIGURE 1. As previously indicated each one of the carriages 22, 22 carry two shafts 80, 80, and each shaft 80 of one carriage 22 is axially aligned with an opposite one of the shafts 80, 80 of the other carriage 22, and when the opposed shafts 80, 80 of one aligned pair are in the extended mandrel forming position, the opposed ends of the shafts 80, 80 are separated by a distance which is less than the length of the mandrel half 23a so that the free ends of the mandrel halves enter the central bore of the cylindrical holder 68 of the opposite mandrel half. The free ends of the mandrel halves are pointed, as can be seen in FIGURE 1, to compensate for any misalignment as the free ends enter the opposite holder. Thus, when the circular mandrel 23 is formed to perform the winding operation, as is described in more detail below, both ends of each mandrel half 23a are firmly supported so that the mandrel 23, formed by the two halves 23a, 23a, is rigidly supported between the opposed ends of the shafts 80, 80. When the mandrel 23 is thus formed, rotation of shaft 21 by motor 50 brings about the rotation of the mandrel 23 about its longitudinal axis because both of the opposed shafts 80, 80 are rotated by way of gears 90, 90 on their opposite ends meshing with gears 36, 36.

The collar 104 of each shaft 80 is separate from its associated arm 100 by a thrust bearing 105, the collar being forced towards the arm by the spring 106. Accordingly, when roller 101 is not in a cam engaging position, it is actually the engagement of arm 100 with a boss or washer 112 surrounding shaft 91 on plate 75 which controls the axial travel of opposed shafts 80, 80 towards each other.

Below each plate 75 of each carriage 22, the frame 20 is provided with vertical partitions 107, 107 having arcuate recesses 108, 108 in the top edges thereof, each recess 108 being concentric relative to sleeve 37. Secured in each recess by screws 109 (FIG. 2) and extending axially away from the winding area between plates 75, 75 are two cam members 110, 110. As can be seen in FIGURE 2, each cam member is of arcuate cross-section concentrically disposed about shaft 21. For reasons which will become apparent, one of the cam members is longer than the other by substantially 15° at the high end, one cam being subtended by an angle of 165° and the other 180° (FIG. 2). Each cam member 110 has a cam surface 111 which slants away from partitions 107, and this cam surface 11 being radially spaced from shaft 37 a distance equal to the radial spacing of rollers 101 provides a ramp-like surface along which rollers 101 ride as each roll is rotated under shaft 21 by carriage 22. As the roller 101 climbs the cam surface 111, arm 100 is thereby forced away from plate 75, and arm 100, through bearing 105, forces collar 104 back away from plate 75 against the biasing effect of spring. As collar 104 is thus forced back, shaft 80 is likewise shifted to a retracted roll dispensing position as in the case of the shafts 80, 80 shown above shaft 21 in FIGURE 1.

In addition to the pairs of shafts 80, 80 and 91, 91 included in each carriage 22, there is also provided another pair of supporting bars 113, 113 each of which is adjacent and parallel to one of the shafts 80. The bars 113, 113 are fixed to and pass through aligned bores in both plates 75 and 76 to make the carriage rigid and are provided adjacent their ends in the winding area between plates 75, 75 with roll stripping members 114. The stripping members 114 are fixed to the bars 113 by set screws 115 (FIG. 2) and each member 114 has a pair of fingers 116, 116 which straddle the mandrel half 23a carried by the adjacent shaft 80.

Figure 4:
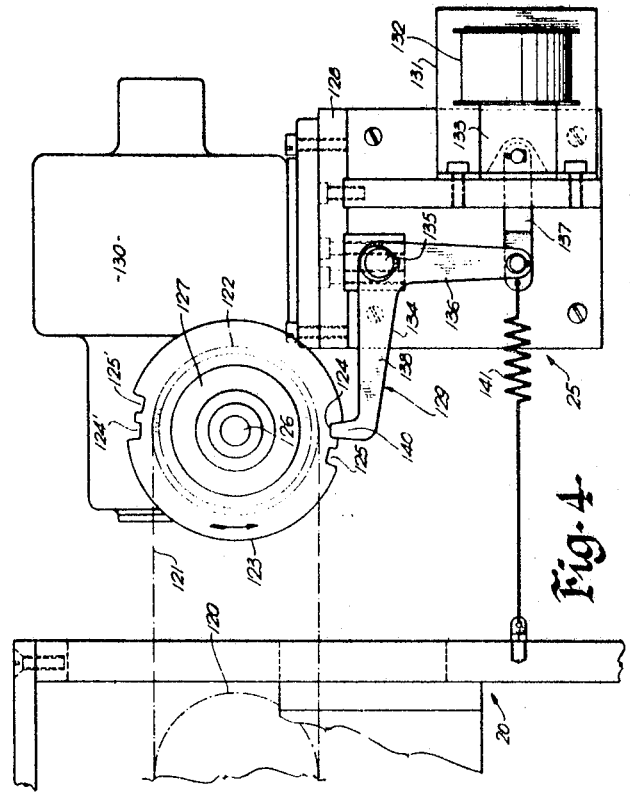
FIGURE 4 is a side view of a drive system for indexing the winding mandrels of the machine according to the present invention.

Secured to one of the carriages 22 is a sprocket 120 (FIGS. 1, 2 and 4) which is connected through a drive chain 121 to sprocket 122 in drive system 25 (FIG. 4).

Sprocket 122 is connected for rotation with a notched wheel 123 which has in its periphery notches 124, 124' and diametrically opposed notches 125, 125'. Notches 124 and 125 are spaced by 15° as are notches 124' and 125', i.e. notches 124 and 125, 125 and 124', 124' and 125', and 125' and 124 are subtended by angles of 15°, 165°, 15° and 165°, respectively.

Sprocket 122 and wheel 123 are mounted on the output shaft 126 of an electric motor 130, mounted on a section 128 of frame 20, wheel 123 being drivingly connected to shaft 126 through a slip clutch 127. Also mounted on section 128 of frame 20 is a solenoid 131 having a coil section 132 and actuating core 133. A bell crank 134 is pivotally mounted on a stub shaft 135 which is fixed to the frame section 128. One arm 136 of bell crank 134 is connected by link 137 to actuating core 133, while arm 138 of bell crank 134 is provided with an out-turned lug 140. A spring 141 is fixed at one end to the frame 20 and at its other end to link 137 so as to always bias link 137 to the left as viewed in FIGURE 4. This biasing effect pivots bell crank 134 in a clockwise direction when solenoid 131 is not energized so that lug 140 is forced against wheel 123, and as wheel 123 rotates the lug 140 is thereby forced into one of the notches in the periphery of the wheel. When lug 140 is received by one of the notches 124, 125', 125, 125', wheel 123, and accordingly sprockets 120 and 122, are held against rotation, even though output shaft 126 continues to rotate, clutch 127 permitting the relative rotation of shaft 126 with respect to wheel 123. When solenoid 131 is momentarily energized by way of controls described below, bell crank 134 is pivoted against the biasing effect of spring 141 and lug 140 is removed from the notch in wheel 123 so that drive through shaft 126, clutch 127, wheel 123, sprocket 122, chain 121, sprocket 120 to carriage 22 is resumed, whereby carriages 22, 22 are indexed through a rotation of 15° or 165° depending on the orientation of wheel 123. Since both of the carriages 22, 22 are fixed to sleeve 35, the carriages index together about shaft 21.

Mounted on a horizontal plate 144, which is part of the frame 20, extending between partitions 107, 107 (FIG. 1) is heating element operating mechanism 28 (FIG. 8). The mechanism 28 has a bracket member 145 which is secured to plate 144 by screws 146. The bracket member 145 provides two parallel upwardly projecting supporting lugs 147, 147, one of which is shown in FIGURE 8. The lugs 147, 147 carry therebetween a pivot pin 150 which is parallel to mandrels 23 and supports a carrier linkage 148. The linkage 148 includes a supporting link 151 which is pivotally mounted on pin 150 adjacent one of its ends and has a heating element carrier head 152 pivotally mounted on its other end by bolt 153. Mounted below plate 144 by screws 154, 154 is a solenoid 155 which consists of a coil section 156 and actuating core 157. A link 160, which is preferable a spring loaded plunger assembly, connects core 157 to the link 151 intermediate the ends of link 151, the link 160 being pivotally connected to core 157 and link by pins 161 and 162, respectively. Link 160 is preferable a spring loaded plunger, as mentioned, so that it can stretch in length when quickly put under tension but will automatically resume its original length and thereby absorb the quick movement of solenoid 155. Link 151 is held in the normal elevated position shown in FIGURE 8 by a spring 163 connected at one end to link 151 and at the other end to a rigid post 164 located behind link 151. As solenoid 155 is energized by control means, described in detail below, link 151 is caused to pivot downwardly about pin 150 in the direction of arrow 165 against the biasing effect of spring 163, and when solenoid 155 is de-energized, it is pulled back to its normal elevated position by spring 163.

The carrier head 152 includes a first member 166 which is pivotally connected to link 151 by pin 153 and a second member 167 which is adjustably secured to member 166 by screw member 168. By turning screw member 168 the heating element 27, which is secured to the top of member 167, can be advanced or retracted relative to member 166 whereby adjustment can be made for the diameter of the capacitor-forming roll 29 being wound on mandrel 23. A resiliently compressible plunger member 170 is pivotally connected between member 166 and a rigid lug 171, which holds the carrier assembly 152 in the normal position shown in FIGURE 8. Accordingly, when solenoid 155 is energized to pull link 151 downwardly in the direction of arrow 165, as previously described, the heating element 27 at first moves on an arc which has its centre at the axis at pin 150 until it engages the periphery of the capacitor-forming roll 29 on mandrel 23. After engagement of the heating element 27 with roll 29, the heating element is still drawn downwardly by solenoid 155, but due to the engagement, the arcuate path followed by heating element 27 is no longer about the axis of pin 150. Instead of heating element 27 being forced into the roll 29, the engagement of heating element 27 with roll 29 causes carrier head to pivot about the axis of bolt 153, which is parallel to mandrel 23, in the direction of arrow 172 (FIG. 8) against the biasing effect of plunger member 170. Therefore, the path of travel of the element from the superimposing of the two pivoting movements approaches an arc about the centre of mandrel 23, i.e. a path along the periphery of roll 29 in the direction of arrow 173. Continued pull of link 160 downwardly by solenoid 155 eventually results in the heating element 27 departing from roll 29 after heating element 27 has been drawn a short arcuate distance along the periphery of the roll.

The heating element 27 may be simply a heated wire having a portion parallel to mandrel 23 for engagement with roll 29, the length of the portion being at least as long as the width of the metallized strips of dielectric member so that the roll is engaged across its entire length. However, the heating element 27 is preferably of the type shown in FIGURE 9. The heating element in FIGURE 9 includes an outer cylindrical member 175 of a polytetrafluoroethylene resin, such as "Teflon," and an inner cylindrical member 176 of "Fluorosint" which is a tetrafluoroethylene resin with other additives sold by Poly Penco Inc., Reading, Penn. The member 176 contains a length of electrical heating coil 179 which is connected at opposite ends to conductors 177, 177. The conductors 177, 177 are rigid L-shaped members which support the element 27 and conduct a current thereto from leads 180, 180 via conducting brackets 181, 181 mounted on an assembly member 182.

Two strips 185 and 186 (FIGS. 1, 2, 3, and 8), each of which consists of a dielectric web 187 having a band 188 of vaporized metal along one side thereof (FIG. 12) are pulled from supply rolls, such as shown at 190 in FIG. 3, by the winding action of the mandrels 23, 23, as will be described in more detail below, the strips 185 and 186 passing around idler rolls 191, 191 (FIG. 3). Rolls 191, 191 guide the strips into the winding area at substantially right angles to shaft 21 from the side of the machine opposite to that on which heating element 27 is located.

Mounted above a top plate 192 (FIG. 2) is a solenoid 195, to the actuating core of which is connected a link 196. Link 196, which extends through opening 197 in plate 192, is pivotally connected to an arm 198. Arm 198 is pivotally mounted on a stationary post 200, which extends downwardly from plate 192, by way of horizontally extending stud 201. Arm 198 carries a resilient extension 202, and on the free end of the extension is mounted a pressure pad 203. When solenoid 195 is energized to pull link 196 upwardly, arm 198 is rotated clockwise as viewed in FIGURE 2, and pressure pad 203 is brought down into engagement with the outer periphery of sleeve 37. The pressure pad 203 is located midway between the plates 75, 75 of the carriages 22, 22 so that when solenoid 195 is energized, the strips 185 and 186, which pass over sleeve 37 are gripped between pressure pad 203 and sleeve 37.

The electrical control circuit shown schematically in FIGURE 10, consists of a plurality of well known components, the specific arrangement of which will become apparent from the following description of the operation of the machine of the present invention. Before proceeding with the description of the step-by-step operation of the machine, however, there are certain general characteristics of the control circuit which should be noted.

As may be observed in FIGURE 10, the electrical circuit is divided into two main parts, namely the first part which is shown at the top of the circuit diagram and the second part shown at the bottom. The first part operates on D.C. power and includes all of the time controlling elements. The second part operates on A.C. power and includes all of the operative components. The timing part of the circuit has two branches, one of which is isolated from the power source by a normally open contact of a set-up relay SR.

The primary functions of the machine are controlled by an electronic counter shown in the upper right-hand corner of FIGURE 10. The counter is responsive to discrete pulses received from a photocell 208 to which light is intermittently admitted from a source 207 through diametrically opposed apertures 206, 206 in a disk 205. The disk 205 is mounted on one end of shaft 21 (FIG. 1 and 10). Accordingly, the counter is pulsed twice per revolutions of shaft 21 and since gears 90 and 36 have a 1:1 ratio the counter is pulsed twice for each winding revolution of each mandrel 23. Two apertures 206, 206 are provided in disk 205 instead of one since this affords more accurate control than if the counter was pulsed only once per revolution of the mandrel. The counter is preset to carry out a sequence of operations at predetermined intervals, i.e. when a preselected number of turns have been wound on one of the mandrels 23, 23.

In the following description of the operation of the machine, it will be assumed that initially the machine is in a rest position with the mandrels 23, 23 in the positions shown in FIG. 5. Prior to the stopping of the machine, the last function of the machine was that of severing the roll 29 from continuous strips 185, 186, vaporizing electrode bands 188, 188 on the outer layers of the roll, and fusing the severed outer ends of the dielectric web 185, 185, on the roll to the outer periphery of the roll 29 (FIG. 12) by the downward stroke of heating element 27, this being followed by the return of heating element 27 to its normal position. As shown in FIGURE 10, both parts of the control circuit are in a power-on-condition, but additional means (not shown) are provided, of course, for disconnecting the respective power sources to permit a complete shut-down. With the power on, and prior to operation of start button SB, timers TM–1, TM–4 and TM–7 and solenoid-controlling relay RS–3 are energized. Solenoid 195 is thereby energized by RS–3 and this maintains pressure pad 207 bearing on the strips at sleeve 37 to keep the strips 185 and 186 stretched taut between sleeve 37 and rolls 191, 191 as is shown in FIGURE 5. As has been previously described and as can be readily seen in FIGURE 10, winding motor 50 and indexing motor 130 are also energized and run continuously when the power is on.

Depression of the start button SB closes the counter reset circuit momentarily to assure that it is in condition for beginning a new cycle and that relays R–1, R–2 and R–3 are de-energized. The start button SB also energizes control relay CR–3 which locks in through its normally open contacts. Relay CR–3 also closes contacts in the circuit of set-up relay SR, which locks in through its own contacts, and in a further reset circuit for the counter. However, CR-3 has no effect on the counter at this time because its contacts are in series with normally closed, but now open, contacts of timer TM-7, the contacts of timer TM-7 being open at this time because, as previously mentioned, timer TM-7 is energized prior to operation of starter button SB.

The operation of set-up relay SR connects the otherwise isolated branch of the timing circuit to the D.C. power supply. This now permits operation of timer TM-9 followed by slow operated timer TM-8 through normally closed contacts of solenoid-controlling relay RS-2 and of relay R-1. Energization of slow operated timer TM-8 opens a pair of normally closed contacts in series with timer TM-9. Timer TM-9, which is of a slow release type, accordingly slowly releases to open a pair of contacts in the circuit of solenoid-control relay RS-1. Therefore, during the brief time timer TM-9 is energized solenoid-control relay RS-1 is energized to operate solenoid 131.

As previously described, lug 140 on bell crank 134 is pulled out of notch 124 in wheel 123 when solenoid 131 is energized. This permits motor 130 to rotate the sprocket 120 through clutch 127, wheel 123, sprocket 122, and chain 121, whereby carriages 22, 22 are rotated together in the direction of arrow 209 in FIGURES 5 and 9. The energization and then de-energization of solenoid 131 is sufficiently rapid, as determined by the operation of timer TM-8 and then the release of timer TM-9, that lug 140 drops into notch 125, and carriages 22, 22 are only indexed, i.e. rotated, about shaft 21 15° and then locked against further rotation.

Prior to the indexing of 15° the two stripped mandrel halves 23a, 23a which are diametrically opposite to the mandrel 23 carrying the capacitor-forming roll 29, are completely separated since the rollers 101, 101 associated with the shafts 80, 80 carrying the stripped mandrel halves 23a, 23a have climbed to the top of cam surfaces 111, 111, as previously described and as is shown at the top of FIGURE 1. As the carriages commence the indexing 15°, as described above, one of the rollers 101 leaves one of the cam surfaces first. As described previously, one of the cam member 110, 110 is shorter than the other by substantially 15° at the high end, and this arrangement causes an out-of-step action of the rollers 101, 101. Once one of the rollers 101 has left its cam surface 111 the associated shaft 80 is immediately forced to the extended position so that the mandrel half 23a held thereby extends under the portion of the strips 185 and 186 held between rolls 191, 191 and sleeve 37 by pressure pad 203. As the carriages 22, 22 continue their indexing through the 15° the extended mandrel half 23a engages the strips 185 and 186, and continued upward movement of the extended mandrel pushes the two strips into engagement with each other over the flat side of the extended mandrel halve 23a The extended mandrel is properly oriented so that its flat side is always up during the indexing of the carriages 22, 22, through the 15° by virtue of the fact the projection 55 always engages the arm 64 at the same place to stop shaft 21 at the same place and the shafts 80 are connected to shaft 21 by gears 90 and 36 which have a 1:1 ratio. As the carriages 22, 22 approach the end of the 15° indexing, the other roller 101 leaves its cam surface 111 so that its associated shaft 80 moves to the extended position. As this second shaft 80 moves to the indexed position, the mandrel half 23a carried thereby moves to overlap the already extending mandrel half 23a and thereby forms a diametrical split mandrel 23 of circular cross-section as previously described. The strips having been stretched tightly over the flat side of the first extended mandrel half 23a, is thus caught in the slit between the two halves 23a, 23a as is shown in FIGURE 6.

Simultaneously with the connection of timers TM-8 and TM-9 to the D.C. power source, set-up relay SR opens normally closed contacts to de-energize timer TM-1, which in turn causes energization of a timer TM-2. This action causes energization of a solenoid-controlling relay RS-2 which locks in through its own normally open contacts and a pair of normally closed contacts associated with relay R-3. This in turn energizes solenoid 60 through now closed, but normally open, contacts associated with energized set-up relay SR.

As solenoid 60 is energized, arm 64 is retracted to permit motor 50 to commence driving shaft 21, as previously described, whereby the mandrel 23, which has just been formed with strips 185 and 186 held between mandrel halves 23a, 23a, starts to rotate. Since the sequence which leads to the rotation of the mandrel 23 is initiated at the same time as the previously described mandrel indexing sequence is initiated, timers TM-1 and TM-2 are of the slow release type and slow operate type, respectively, and are adjusted to ensure that drive is not started through clutch 42 until after the indexing step is completed. Timer TM-2 switches motor 50 into high speed as the winding of the new capacitor-forming roll is commenced due to the fact normally open contacts TM-2 associated with a variable speed drive VSD are closed, variable-speed drive VSD being arranged to switch motor 50 back into low when contacts TM-2 are opened.

Energization of timer TM-2 further results in the opening of normally closed contacts in series with timer TM-4, whereby timer TM-4 is de-energized, and solenoid-controlling relay RS-3 is thereby deactivated. At the beginning of this cycle, solenoid-controlling relay RS-3 was energized through two branches, one of which contains normally closed contacts of set-up relay SR and the other of which contains normally open contacts of solenoid-controlling relay RS-3 and timer TM-4, the latter two being in series. The energization of set-up relay SR resulted in the opening of the normally closed contacts in the first mentioned branches so that solenoid-controlling relay RS-3 was left energized through its own contacts and those of operated timer TM-4. Accordingly, with the release of timer TM-4, which is of the slow release type, solenoid-controlling relay RS-3 is de-energized so as to result in the de-energization of solenoid 195. Upon de-energization of solenoid 195, link 196 (FIG. 2) is lowered, whereby pressure pad 203 is moved away from sleeve 37 to the raised position shown in FIGURE 7. Due to the slow release of timer TM-4, the newly formed mandrel 23 begins to rotate and coil the strips 185, 196 to thereby firmly grasp strips 185, 186, which extend through the diametrically extending slit between mandrel halves 23a, 23a, before the strips are released by pressure pad 185, 186.

The number of turns wound on mandrel 23 at the high speed is controlled by the counter. The strips 185 and 186 are pulled by the winding operation from the supply rolls and the strips superimposed on each other are thus coiled onto the rotating mandrel to produce a roll of interleaved layers of dielectric webs and electrode bands as shown in FIGURE 12. The mandrel 23 is rotated at the high speed until the counter has received a preselected number of pulses from photocell 208, the number of pulses indicating twice the number of turns of each strip in the roll on the mandrel. The counter having reached this first preset closes a contact to energize the relay R-1. The energization of relay R-1 re-energizes timer TM-1 through a circuit parallel to the normally closed contacts of set-up relay SR, which contacts are now open. The energization of relay R-1 also opens normally closed contacts in series with contacts of solenoid-controlling relay RS-2 in the circuit including timers TM-8 and TM-9. The normally closed contacts of solenoid-controlling relay RS-2 in this circuit stand open at this time due to the prior energization of solenoid-controlling relay RS-2.

Accordingly, timer TM–1 having been energized by relay R–1 operates to de-energize timer TM–2 which releases to open its contacts of the variable speed drive and thereby switch winding motor 50 back into slow speed operation. Thus the rotating speed of the mandrel 23 is reduced after a predetermined number of turns have been formed in the capacitor-forming roll. The de-entergization of timer TM–2 also opens the circuit containing timer TM–4 which has no effect on the operation of the machine at this time. Relay R–1, which is under the control of the counter, remains operated until the counter is reset at the end of the machine.

The counter continues to receive pulses from photocell 208, after energization of relay R–1, two for each revolution of mandrel 23, since shaft 21 continues to rotate slowly until a second preset is reached, this second preset being reached a sufficient length of time after the first preset to enable the speed of mandrel rotation to be completely changed to the slow speed. On reaching the second preset, the counter energizes relay R–2. The operation of relay R–2 closes contacts in the circuit containing timers TM–8 and TM–9. In series with these contacts of relay R–2 are normally closed contacts of a timer TM–6. At this time, timer TM–6 is de-energized since it is in series with normally closed, but now open, contacts of energized timer TM–7. Accordingly, timers TM–8 and TM–9 are again operated, as previously described. When solenoid 131 is briefly energized this time, however, wheel 123 is driven through 165° before lug 140 falls into notch 124′. This results, of course, in carriages 22, 22 being indexed 165° to the position shown in FIGURE 7. Accordingly, the capacitor-forming roll 29 in the process of being wound is carried over to the opposite side of sleeve 37 to a position adjacent heating element 27.

As the carriages are indexed through 165°, the roll which had already been severed from the continuous strips 185 and 186 is stripped from the other mandrel halves 23a, 23a and falls into a container (not shown) below the winding area. During the indexing, the rollers 101, 101 associated with the mandrel 23 carrying the already severed roll travel up the cam surfaces 111, 111. This retracts shafts 80, 80 and thus longitudinally separates the mandrel halves 23a, 23a. On separating, mandrel halves 23a, 23a are pulled from the centre of the severed roll from opposite sides, and the roll is prevented from travelling sideways with either of the mandrel halves through engagement with one of the stripping members 114, 114. Accordingly, by the time the carriages have indexed through the 165° the rollers 101, 101 have reached the high parts of cam members 110, 110 and the severed roll has fallen, as just mentioned, from the winding area.

Relay R–2 which remains energized the same as relay R–1, also closes a timer TM–3 which in turn energizes solenoid-controlling relay RS–3. Solenoid 195 is thereby again energized to bring pressure pad 203 down from the position shown in FIGURE 7 against the strips 185 and 186 passing over sleeve 37. Timer TM–3 is of the slow-operated type to permit the complete indexing of 165°.

The mandrel 23 is still being rotated at this stage, but the pressure applied by pressure pad 203 is not too great to prevent the strips 185 and 186 from being pulled between it and the sleeve. After the mandrel 23 has turned an additional pre-selected number of turns, which are registered in the counter, the counter reaches a third preset. At the third preset, relay R–3 is energized which opens the normally closed contacts of R–3 in the circuit containing solenoid-controlling relay RS–2. This results in the de-energization of solenoid 60 so that arm 64 is permitted to move against stop member 71. When arm 64 is against stop member 71, it is in the path of rotating projection 55 so that the outer end 74 is immediately engaged by rotating projection 55, and shaft 21 is stopped. Thus, the winding of the strips on mandrel 23 is ceased.

Energized relay R–3 further energizes a timer TM–5, which in turn closes contacts in series with a solenoid-controlling relay RS–6 which locks in through its own contacts and normally closed contacts of a de-energized timer TM–10. Solenoid-controlling relay RS–6 operates solenoid 155, which pulls link 151 down through link 160. This action swings the heating element 27, which is supplied with an electrical current flowing through leads 180, 180 and is thereby heated to a temperature sufficient to evaporate the metalized bands in the outer layers of the roll 29 and melt the outer layers of dielectric web upon contact, down to intercept the outer periphery of the recently wound roll 29, which is now held stationary on mandrel 23. When the heating element 27 engages the roll 29 across its entire length the carrier head is forced back against the biasing effect of plunger member 170, as previously described, so that the heating element 27 is drawn a short arcuate distance along the outer periphery of roll 29 before leaving the roll. The engagement of the heating element melts the dielectric web 187, 187 across their widths so that the continuous strips 185 and 186 are severed from the roll 29 as indicated in FIGURE 12. As the heating element 27 moves away from the dielectric webs 187, 187 of the severed ends of the continuous strips 185, 186, which will be in the exterior of the next wound roll fuse together, and due to the fact the heating element 27 has also evaporated the bands 188, 188 at the fused area, the bands at the severed ends of the continuous strips are isolated from each other. As the element 27 is drawn along the periphery of the roll 29, the outer two melted layers of the dielectric web are drawn over the next outer layer of the dielectric web of the roll which is also temporarily melted by the passing heating element and as the heating element passes the outer three layers 187 fuse together as shown in FIGURE 12. Thus the roll is sealed against unravelling. The outer layers of the electrode band 188 in the area of the seal are simultaneously evaporated by the heat from the heating element so that the electrode bands are isolated at the outer periphery of the roll 29. Due to the fact the heating element 27 is drawn along a peripheral arc of the roll a larger seal area and more effective seal is provided, and this action permits only a superficial evaporation of the electrode bands which is, of course, desirable since no benefits would result from the vaporization of more inner layers of the bands. By providing an outer casing of Teflon, as shown in FIGURE 9, none of the melted dielectric web adheres to the heating element and this results in a clean seal area.

Because timer TM–5 is of the slow operated type, it is ensured that the mandrel 23 has completely stopped before the heat element 27 is carried through its operating stroke. The heating element 27 remains in its operated position until solenoid-controlling relay RS–6 is de-energized by the operation of timer TM–10 as described hereinafter.

Due to the energization of timer TM–5, timer TM–6 is in turn energized. Timer TM–6, being of a slow operated type, slowly opens its contacts in series with timer TM–7. Since timer TM–7 is of the slow release type the sequence initiated by the energization of timer TM–6 is not effected before the heat sealing and severing operation described above is completed. As timer TM–7 releases due to its de-energization, the reset circuit for the counter is energized through the already closed contacts of control relay CR–3. This immediately resets the counter and releases relays R–1, R–2 and R–3 which, together with the associating release of solenoid-controlling relay RS–2, again energizes the timers TM–8 and TM–9 through normally closed contacts of relay R–1 and solenoid-controlling relay RS–2. Thus, wheel 123, upon energization of solenoid 131 due to the energization of timers TM–8 and TM–9, is permitted to rotate through 15° until lug 140 drops into notch 125′. Accordingly, carriages 22, 22 are indexed 15° once more. This brings the mandrel halves 23a, 23a, which where stripped by the previous indexing of 165°, into their mandrel forming position with the continuous strips 185 and 186 held therebetween.

The releasing of timer TM–7 completes a circuit through a slow release relay R–11 which locks through its own contacts in a locking circuit containing the normally closed contacts of timer TM–10. Therefore, timer TM–10 is connected to the power source by the associated contacts of relay R11, and timer TM–10 operates to de-energize solenoid-controlling relay RS–6 which in turn releases solenoid 155. Thus the operating mechanism 28 resumes its normal or idle position under the action of spring 163. Due to the fact timer TM–10 is of the slow operating type, the roll 29, which as just been engaged by heating element 27, is indexing through the 15° away from the severing and sealing position before heating element 27 is permitted to return to its idle position.

At this point the machine has been automatically recycled and as the carriages complete the indexing of 15° the winding of a new roll 29 commences and the cycle is automatically carried through again in the manner previously described. Once operated, however, it will be understood that relay R–3 and the set-up relay SR remain energized and do not enter into the automatic recycling. When it is desired to stop the machine, the start button SB is operated to de-energize control relay CR–3 so that at the end of the cycle, the counter cannot reset on closure of contacts of the timer TM–7.

It is believed apparent from the above that the machine of the present invention is capable of quickly and automatically preparing capacitor-forming rolls, which rolls are of a high and uniform quality. By simultaneously severing the roll from the continuous strips, fusing the outer layers of dielectric web together, and vaporizing the outer layers of electrode bands in the fused area with the heating element, the cycle can be carried out rapidly, and the resulting rolls have a uniform capacitance value. It is believed that the advantages over the prior used method of servering the two strips at different lengths and then wrapping the roll with a tape are readily apparent. The outer periphery of a roll prepared by this prior method, which is described in more detail above is shown in FIGURE 11. In this roll, the outer layers having been severed at different lengths, as shown at 220, 221, to avoid shorting of the electrode bands are wrapped with an adhesive tape 222 to hold the roll together. Not only is the method of preparing such a roll time consuming as compared to the method of the present invention, but, as previously described, the capacitance of capacitors massed produced by the known method varies due to the fact that the end of the wound strips are free to move tangentially and axially between the cutting step and the application of the adhesive.

It is believed also obvious from the above description of the machine of the present invention that the size of the capacitor-forming rolls can be readily varied by simply changing the first preset of the counter prior to starting the machine.

I claim:

1. A method of making a capacitor from continuous metallized strips of dielectric material, each strip consisting of a continuous plastic web having an electrode band formed integrally along one side surface thereof, said method comprising the steps of winding said strips on a mandrel to form a roll of interleaved dielectric and electrode layers, engaging the periphery of the roll along the length thereof with a heated element, said element being heated to a temperature above the melting point of the plastic web and above the vaporization temperatures of said electrode band, drawing said element a short arcuate distance therealong to thereby sever the outer layers of the roll from said continuous strips, vaporize the outer electrode bands from the surfaces of the plastic webs forming the outer layers along said distance, and fuse the severed ends of the outer dielectric layers of the roll to the outer peripheral surface of the roll, and withdrawing said element from said roll to thereby permit complete solidification of the fused dielectric material.

2. A method of making a capacitor from a pair of continuous metallized strips of dielectric material, each strip of said pair consisting of a continuous plastic dielectric web having an electrode band of vaporized metal extending along one side surface thereof, said method comprising holding said strips adjacent free ends thereof between two sections of a longitudinally split mandrel with one strip superimposed on the other and the dielectric web and electrode bands interleaved, spinning said mandrel until a roll of a predetermined number of interleaved dielectric and electrode layers is formed, engaging the periphery of the roll along the length of the roll with a heated element, said element being heated to a temperature above the melting point of the plastic web and above the vaporization temperature of the metal forming said band, drawing said element a short arcuate distance along the periphery of the roll to vaporize the two outer layers of electrode bands along said distance and to melt the three outer layers of dielectric web along said distance and thereby sever the roll from a said pair of continuous strips, and fuse together the three outer layers of dielectric web, and removing said roll from said mandrel.

3. An apparatus for making a capacitor-forming roll from continuous strips, each strip consisting of a dieletric web having an electrode band formed integrally along one side surface thereof, said apparatus comprising a roll winding mandrel having means for holding said strips prior to winding, means arranged to rotate said mandrel and thereby wind said strps about said mandrel to form said roll, a band vaporizing and web melting heating element at least equal in length to said roll, a heating element carrier linkage, said heating element being pivotally mounted on said linkage and extending parallel to said mandrel, motor means connected to said linkage for shifting said linkage through a sever and fuse stroke, spring means biasing said heating element towards said mandrel during said stroke and permitting said mandrel element to pivot away from said mandrel for tracing a short arcuate distance along the periphery of the roll on said mandrel.

4. An apparatus as defined in claim 3, wherein said heating element includes a roll engaging cylindrical outer casing of polytetrafluoroethylene having a length greater than the length of the capacitor forming roll, an elongated electrical heating coil within said casing, and a pair of electrical conductors fixed to and supporting opposite ends of said casing and connected to opposite ends of said coil.

5. An apparatus for making capacitor-forming rolls from a pair of continuous strips, each strip consisting of a dielectric web having an electrode band formed integrally along one side surface thereof, said apparatus comprising a pair of mandrel carriages mounted on a common axis and being axially spaced to define a roll winding area therebetween, a pair of axially aligned, rotatable, mandrel carrying shafts mounted one each in said carriages, said shafts being parallel to said common axis and having opposed ends in said roll winding area, said shafts being shiftable relative to each other towards and away from a mandrel forming position, a pair of elongated mandrel halves of semi-circular cross-section each projecting axially from one of said opposed ends of said shafts and overlapping as said shafts shift to said mandrel forming position to form in union a roll winding mandrel of circular cross-section, means for indexing said carriages about said common axis for moving said mandrel between a first winding position and a second roll sealing position, a stationary arcuate cam surface concentrically disposed about said common axis, said surface slanting away from said winding area in the direction of indexing about said common axis, a cam follower for engaging said surface as said mandrel is indexed from said second to said first position, said cam follower also engaging one of said shafts for axially shifting said one shaft away from said winding area as said cam follower engages the slanted cam surface to thereby separate said mandrel halves, drive means for rotating said shafts to wind a roll of said strips on said mandrel, and a band vaporizing and web melting heating element adjacent said roll sealing position, a motor and linkage means for drawing said heating element along a short arcuate length of the periphery of said roll on said mandrel at said sealing position.

6. An apparatus as defined in claim 5, and further comprising a roll stripper secured to one of said carriages and extending into said winding area, said stripper having a pair of fingers straddling the mandrel half carried by said one shaft whereby the mandrel half carried by said one shaft is drawn longitudinally through said fingers as said one shaft is shifted from the mandrel forming position.

7. An apparatus for making capacitor-forming rolls from a pair of continuous strips, each strip consisting of a dielectric web having an electrode band along one side surface thereof, said apparatus comprising a frame, a main drive shaft mounted for rotation in said frame, an elongated sleeve member surrounding a mid-portion of said main drive shaft and being journalled for relative rotation around said main drive shaft, a pair of carriages fixed to said sleeve member and being axially spaced on said sleeve member to define a roll winding area therebetween, two mandrel supporting shafts rotatably mounted in each carriage parallel to said sleeve member and being on diametrically opposite sides thereof, each mandrel supporting shaft in one carriage being axially aligned with one of the mandrel supporting shafts in the other carriage to provide a working pair of mandrel supporting shafts, each working pair being geared to the main drive shaft for rotation in the same direction and having spaced opposed ends extending into said roll winding area, means for axially shifting each working pair from a first extending position to a second position retracted from said roll winding area, two pairs of elongated mandrel halves each being of semi-circular cross-section and being attached to and projecting from one of said ends of the mandrel supporting shafts, the mandrel halves supported by each working pair of mandrel supporting shafts being arranged to be axially separated as the attached mandrel supporting shafts thereof are shifted to said second position and being arranged to overlap as the attached mandrel supporting shafts thereof are shifted to said first position and thereby form in union a diametrically split roll winding mandrel of circular cross-section, means for guiding said pair of strips into said roll winding area from one side of said roll winding area at substantially a right angle to said main drive shaft, means for indexing said sleeve member and the pair of carriages fixed thereto through two one half turns per roll forming cycle of the apparatus to thereby move each mandrel in turn from said one side over said main drive shaft to the opposite side of said roll winding area, an elongated band vaporizing and web melting heating element, and an actuating mechanism mounting said element on said frame parallel to the mandrels on the said opposite side of said roll winding area and arranged to move said element relative to said mandrels through a roll engaging stroke after each indexing of the carriage through one half turn.

8. An apparatus as defined in claim 7, further comprising a strip holding pressure pad, and actuating means arranged to move said pressure pad against the upper surface of said sleeve member between the mandrels after each indexing of said carriages and prior to operation of the heating element actuating mechanism.

9. An apparatus as defined in claim 7, wherein the means for axially shifting the working pairs of mandrel supporting shafts between the first and second positions comprises a pair of cam members of arcuate cross-section concentrically disposed with respect to said sleeve member, each cam member being fixed to said frame below each carriage and having a cam surface slanting away from the roll winding area in the direction of indexing of the carriages, a collar fixed on each mandrel supporting shaft, a spring compressed between the carriages and the side of the collar opposite to the roll winding area and biasing the mandrel supporting shaft to said first position, and a cam follower associated with each mandrel supporting shaft and engaging the other side of said collar, each follower being arranged to engage one of said cam members as the mandrel supporting shaft associated therewith is indexed under said main drive shaft from said opposite to said one side of said roll winding area and follow the cam surface of the said one cam member away from said indexing area to thereby force the associated mandrel supporting shaft thereof to the retracted position.

10. An apparatus as defined in claim 9, wherein one of the cam members is arranged to be engaged by the cam followers until the carriages approach the end of a one half turn index and the other terminates prior to said one cam member in the direction of indexing, whereby one mandrel supporting shaft in a working pair is permitted to return to the extended position under the biasing effect of said spring prior to the other mandrel supporting shaft in the same working pair.

11. An apparatus as defined in claim 7, wherein the heating element actuating mechanism includes a support member, a head member pivotally connected to said support member, a motor means connected to said support member and arranged to move said support member through an operating stroke, said element being arranged on said head member to move past the adjacent mandrel on a path having a minimum distance from the axis of the mandrel less than the outer radius of one of the capacitor-forming rolls wound on the mandrel as said support member moves through an operating stroke, and means resiliently holding said head member relative to said support member whereby said head member may pivot and permit said element to deflect from said path and follow the outer periphery of the capacitor-forming roll wound on the adjacent mandrel.

References Cited

UNITED STATES PATENTS

| | | | |
|---|---|---|---|
| 2,950,070 | 8/1960 | Thorson et al | 242—56.1 |
| 2,951,655 | 9/1960 | Marcus et al. | 242—56.1 |
| 3,278,130 | 10/1966 | Jannett | 242—56.1 |

EARL M. BERGERT, Primary Examiner

P. DIER, Assistant Examiner

U.S. Cl. X.R.

156—251, 446, 515; 242—56